(12) United States Patent
Martin et al.

(10) Patent No.: US 6,222,700 B1
(45) Date of Patent: Apr. 24, 2001

(54) RADIAL COMPRESSION SPRING TO REDUCE DISC SLIP IN A DISC DRIVE

(75) Inventors: Stephen R. Martin, Louisville; Thomas M. Durrum, Broomfield, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/192,974

(22) Filed: Nov. 16, 1998

Related U.S. Application Data

(60) Provisional application No. 60/065,905, filed on Nov. 17, 1997.

(51) Int. Cl.$^7$ .................................................. G11B 17/038
(52) U.S. Cl. ..................................... 360/98.08; 360/99.12
(58) Field of Search .............................. 360/97.02, 97.03, 360/98.08, 99.05, 99.12; 369/258, 260, 261, 263, 264, 266, 270, 271, 282

(56) References Cited

U.S. PATENT DOCUMENTS

| | | | | |
|---|---|---|---|---|
| 4,764,828 | * | 8/1988 | Gollbach | 360/98.08 |
| 5,243,481 | * | 9/1993 | Dunckley et al. | 360/99.12 |
| 5,367,418 | * | 11/1994 | Chessman et al. | 360/99.12 |
| 5,436,775 | * | 7/1995 | Ishimatsu | 360/98.08 |
| 5,493,462 | * | 2/1996 | Peter | 360/98.08 |
| 5,659,443 | * | 8/1997 | Berberich | 360/98.08 |
| 5,715,114 | * | 2/1998 | Gotou | 360/98.08 |
| 5,781,374 | * | 7/1998 | Moir et al. | 360/98.08 |
| 5,828,518 | * | 10/1998 | Moir et al. | 360/99.12 |
| 5,880,905 | * | 3/1999 | Kazmierczak et al. | 360/98.08 |
| 5,917,677 | * | 6/1999 | Moir et al. | 360/98.08 |

FOREIGN PATENT DOCUMENTS

| | | | | |
|---|---|---|---|---|
| 3816975 | * | 11/1986 | (DE) . | |
| 3-254481 | * | 11/1991 | (JP) | 360/98.08 |
| 93/26006 | * | 12/1993 | (WO) . | |

* cited by examiner

Primary Examiner—David L. Ometz
(74) Attorney, Agent, or Firm—Crowe & Dunlevy

(57) ABSTRACT

A disc mounting system for mounting the discs of a disc drive in a fixed radial relationship to the hub of a spindle motor. The disc mounting system includes a compression spring member located between adjacent discs in the disc stack. The compression spring member has a circular cross-section, and forms a wave shape such as a sinsoidal wave shape encircling the hub of the spindle motor. When the discs are positioned in an intended relationship relative to the hub, high and low peaks on the compression spring member engage chamfers adjacent the bore of the discs, and act to center the discs relative to the spindle motor hub to prevent shifting of the discs relative to the spindle motor hub due to applied mechanical shocks and differential thermal expansion of disc stack elements.

12 Claims, 6 Drawing Sheets

RADIAL COMPRESSION SPRING TO REDUCE DISC SLIP IN A DISC DRIVE

RELATED APPLICATIONS

This application claims the benefit of United States Provisional Application No. 60/065,905 entitled RADIAL WEDGE SPRING TO REDUCE RADIAL DISK SLIP filed Nov. 17, 1997.

FIELD OF THE INVENTION

This invention relates generally to the field of hard disc drive data storage devices, or disc drives, and more particularly, but not by way of limitation, to a new system for mounting the discs to the hub of a spindle motor in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless direct current spindle motor. In disc drives of the current generation, the spindle motor rotates the discs at speeds of up to 10,000 revolutions per minute.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets which are fixedly mounted to the disc drive housing base member. On the side of the actuator bearing housing opposite to the coil, the actuator bearing housing also typically includes a plurality of vertically aligned, radially extending actuator head mounting arms to which the head suspensions mentioned above are mounted. When controlled direct current is applied to the coil a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments as well as in laptop computers which, because of their portability, can be used wherever they can be transported. Because of this wide range of operating environments the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperatures ranging from, for instance, −5° C. to 60° C., and further be capable of withstanding operating mechanical shocks of 100G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature and cleanliness controlled environment. Once mechanical assembly of the disc drive is completed, special servowriters are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, is on circular tracks that are concentric with relation to the spin axis of the spindle motor. The discs, therefore, must be mounted to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued to Bronshvatch et al. on Jun. 18, 1996; U.S. Pat. No. 5,517,376, issued to Green on May. 14, 1996; U.S. Pat. No. 5,452,157, issued to Chow et al. on Sep. 19, 1995; U.S. Pat. No. 5,333,080, issued to Ridinger et al. on Jul. 26, 1994; U.S. Pat. No. 5,274,517, issued to Chen on Dec. 28, 1993; and U.S. Pat. No. 5,295,030, issued to Tafreshi on Mar. 15, 1994; all assigned to the assignee of the present invention. In each of these noted disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, an axial force is applied to the disc stack and a disc clamp is attached to the spindle motor hub to retain a clamping force. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with an industry trend toward size reduction in the overall disc drive, the size of various components within the disc drive has necessarily been reduced, including the thickness of the discs. As the discs have become thinner, the amount of clamping force that can be applied to the discs without causing mechanical distortion of the discs is limited. That is, variation in the flatness of the disc mounting flange, the discs, and the disc spacers contribute to flatness concerns of the discs relative to the read/write heads. The yield strength of the disc material, too, affects the flatness of the joined assembly provided to the disc stack. All these factors, as well as others known to persons skilled in the art, limit the axial clamping force that can be applied.

Furthermore, the demand for greater non-operating mechanical shock resistance is continuously driving the market with future disc drive products being contemplated as being capable of operating after experiencing non-operating mechanical shocks in the range of 100.

In light of these facts, it is clear that the currently common practice of axially loading the disc stack to prevent shifting of the discs relative to the spindle motor hub is not capable of meeting current and future requirements and a new system for mounting the discs to the spindle motor hub must be provided.

SUMMARY OF THE INVENTION

The present invention relates to a disc mounting system for mounting the discs of a disc drive in a fixed radial relationship to the hub of a spindle motor. The disc mounting system includes a compression spring member located between adjacent discs in the disc stack. The compression spring member can be formed of a spring member housing a circular cross-section and a characteristic shape of a wave form such as a sinusoidal wave. The spring member can form a closed loop that encircles the hub of the spindle motor. When the discs are positioned relative to the spindle motor hub, peaks on the compression spring member pressingly engage a chamfered bore at the innermost diameter of the discs, acting to center the discs relative to the spindle motor hub and preventing the shifting of the discs relative to the spindle motor hub due to applied mechanical shocks and differential thermal expansion of disc stack elements.

The manner in which the present invention is implemented, as well as other features, advantages and benefits of the invention, can best be understood by a review of the following description, when read in conjunction with an examination of the accompanying drawings.

DETAILED DESCRIPTION

Figure 1:
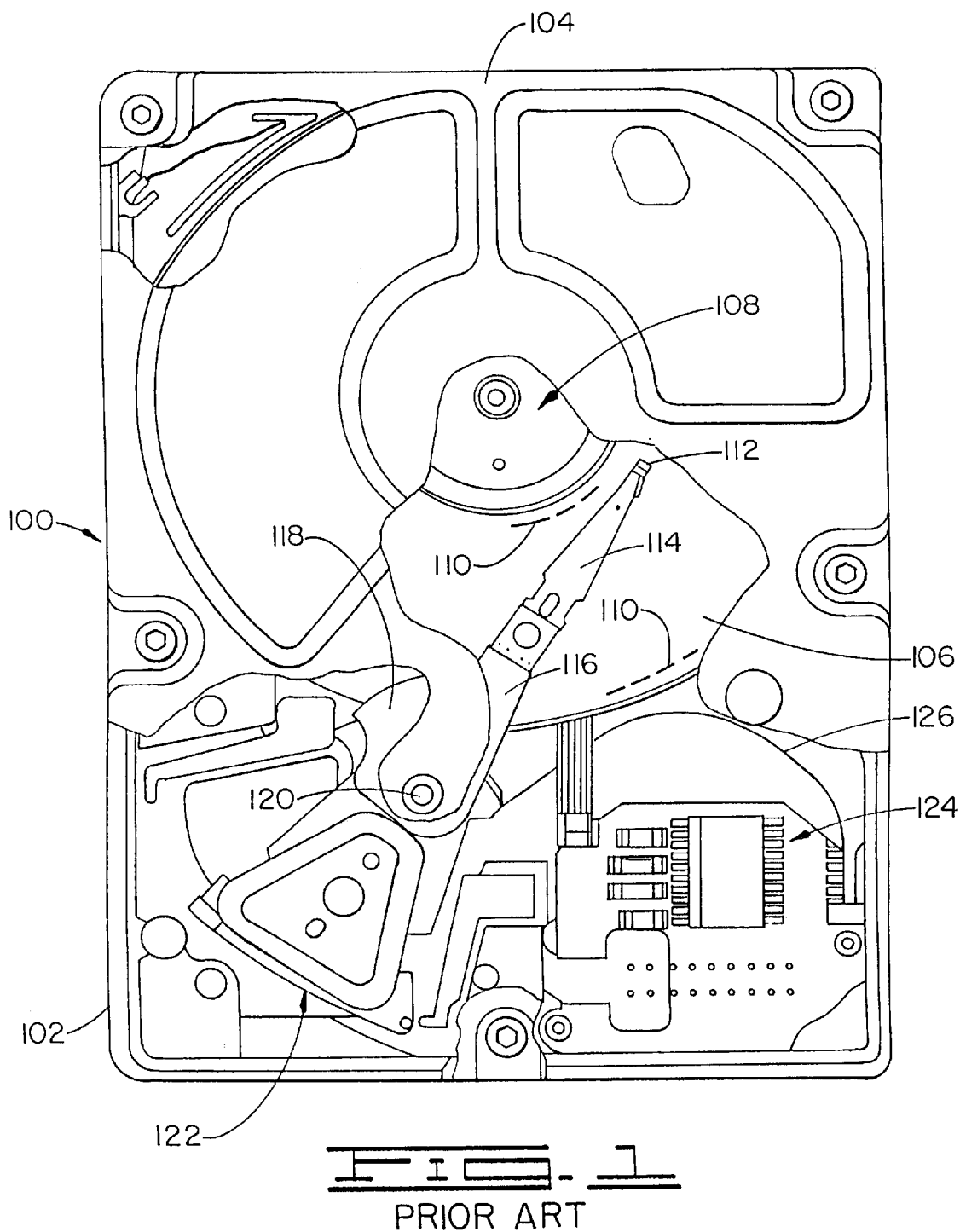
FIG. 1 is a plan view of a prior art disc drive in which the present invention is particularly useful.

Turning now to the drawings and specifically to FIG. 1, shown is a plan view of a disc drive 100 in which the present invention is particularly useful. The disc drive 100 includes a base member 102 to which other components are directly or indirectly mounted and a top cover 104 (shown in partial cutaway) which, together with the base member 102, forms a disc drive housing which encloses delicate internal components and isolates these components from external contaminants.

The disc drive 100 includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) controls all aspects of the operation of the disc drive 100, with control signals to drive the VCM 122 as well as data signals to and from the heads 112 carried between the electronic circuitry and the moving actuator assembly via a flexible printed circuit cable (PCC) 126.

Figure 2:
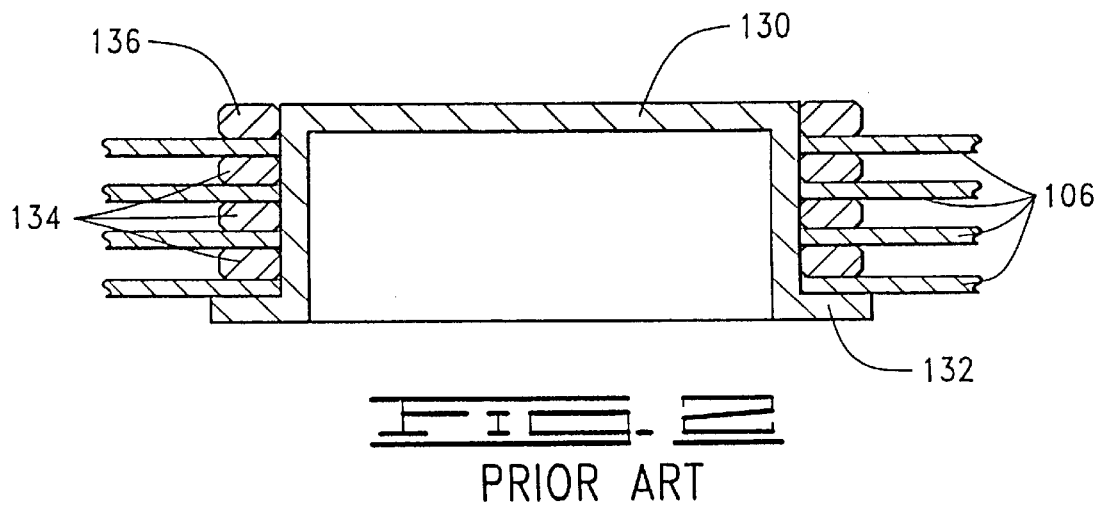
FIGS. 2 and 3 are simplified sectional elevation views of typical prior art disc mounting systems which utilize only axial loading to secure the discs.

FIG. 2 is a simplified sectional elevation view of a typical prior art disc mounting system which utilizes axial loading to secure the discs 106. The figure shows a hub 130 of a spindle motor 108 having a radially extending disc mounting flange 132. The hub 130 is substantially cup-shaped, being closed at the upper end and open at the lower end as shown in FIG. 2. The person of skill in the art will appreciate that the electrical and magnetic components (not shown) to rotate the hub 130 are typically located within the hub 130.

FIG. 2 also shows a plurality of discs 106 and disc spacers 134 which form a disc stack. The disc stack is assembled by placing a first disc 106 over the hub 130 and against the disc mounting flange 132. The disc stack is formed by alternately placing disc spacers 134 and discs 106 over the hub 130 until the intended number of discs 106 have been positioned. A disc clamp 136 is attached to the uppermost portion of the hub 130 to complete the assembly. While FIG. 2 illustrates a disc stack which includes four discs 106, the person of skill in the art will appreciate that the scope of the present invention includes disc stacks having both greater and lesser numbers of discs 106.

In FIG. 2 the disc clamp 136 can be the type referred to in the industry as a "shrink-fit" clamp. Such clamps have a bore that is nominally smaller than the outer diameter of the hub 130. Assembly is accomplished by heating the clamp 136 so that by thermal expansion the disc clamp 136 passes over the hub 130. The desired magnitude of axial loading force can be applied to the disc clamp 136 which in the heated condition can pass longitudinally along the hub 130. After the clamping force is applied the disc clamp 136 is cooled to shrink into an interference fit with the hub 130 thereby lockingly engaging the disc clamp 136 and the hub 130.

Figure 3:
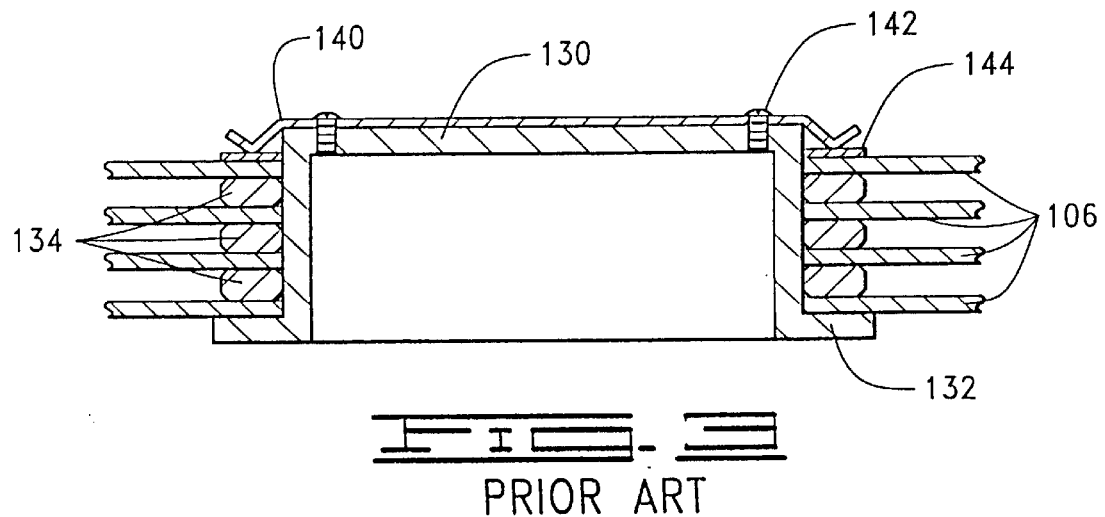

Turning now to FIG. 3, shown is a simplified sectional elevation view, similar to that of FIG. 2, showing a second prior art disc clamping system. FIG. 3 shows a hub 130 of the spindle motor 108 incorporating a disc mounting flange 132 similar to that shown in FIG. 2, and a stack of discs 106 and disc spacers 134, also similar to those of FIG. 2.

FIG. 3 shows a disc clamp 140 of the type known in the industry as a "spring clamp." Such disc clamps 140 are typically formed from flat sheet stock having the desired spring characteristics and include circumferential corrugations closely adjacent the outer diameter of the disc clamp 140 which form a contact surface (not designated) for exerting axial force to the disc stack when a plurality of screws 142 are assembled through the disc clamp 140 into threaded holes (also not designated) in the hub 130. It is also typical for disc clamping systems incorporating such disc clamps 140 to include a washer member 144 between the contact surface of the disc clamp 140 and the adjacent disc 106. This washer member 144 aids in evenly distributing the clamping force of the disc clamp 140 about the circumference of the discs 106 and allows for slip contact between the contact surface of the disc clamp 140 and the washer member 144 when the screws 142 are tightened, thus preventing the exertion of radial stresses directly to the disc 106.

Selection of the material and geometry of the disc clamp 140 will determine the amount of axial clamping force exerted by the disc clamping system of FIG. 3, as will be appreciated by persons of skill in the art. Details of typical disc clamping systems incorporating a disc clamp 140 such as that of FIG. 3 can be found in previously mentioned U.S. Pat. No. 5,274,517 and U.S. Pat. No. 5,295,030.

Both of these two prior art disc clamping systems share a common drawback. Specifically, since the bore of the discs 106 must be at least slightly larger than the diameter of the hub 130 to allow for assembly of the discs 106 to the hub 130, the discs 106 are subject to radial displacement after assembly due to differential thermal expansion and applied mechanical shocks. Furthermore, because the clamping forces applied to the disc stack are in the axial direction, the resistance to such radial shifting of the discs 106 is, therefore, a function of the amount of applied axial force and the coefficient of friction. As previously noted, with the continuing market trend for smaller components and higher mechanical shock resistance, such axially loaded disc mounting systems are becoming inherently incapable in meeting new standards.

Figure 4:
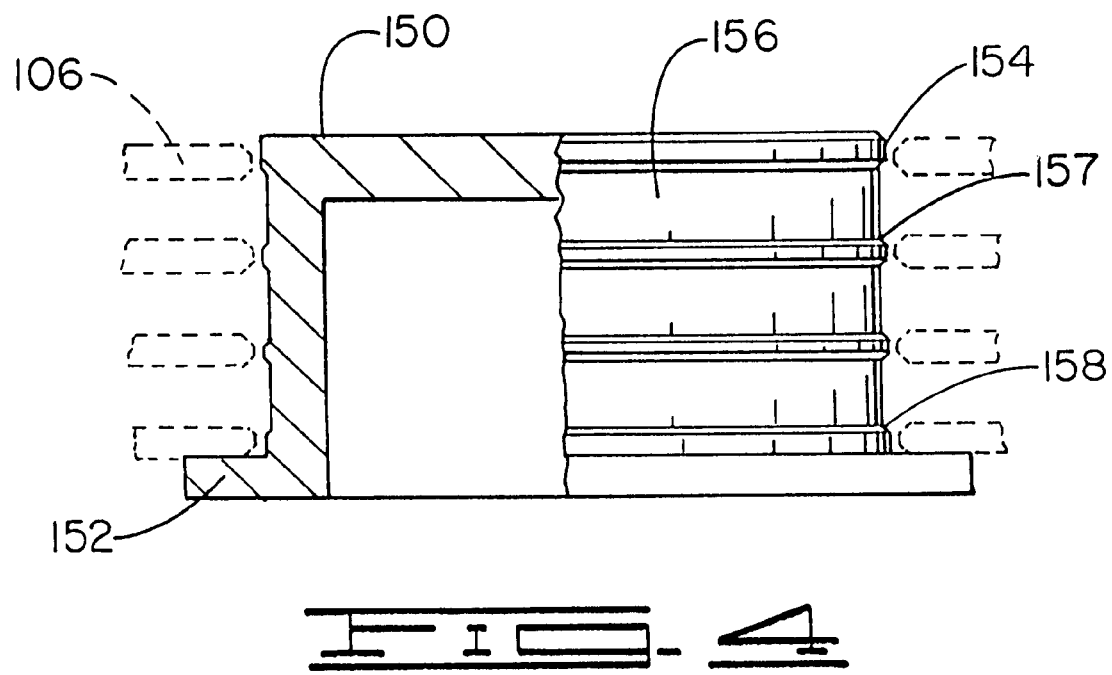
FIG. 4 is an elevation view, partially in section, of a spindle motor hub constructed in accordance with one aspect of the present invention.

FIG. 4 is an elevation view, partially in section, of a spindle motor hub 150 constructed in accordance with one aspect of the present invention. As can be seen in the figure, the spindle motor hub 150 includes a disc mounting flange 152, as was the case with both of the prior art disc mounting systems explained above.

The spindle motor hub 150 has a number of flat portions 154 forming an The spindle motor hub 150 includes a plurality of circumferentially extending flanges 154 each of which nominally aligns with a respective disc 106 (shown in dashed lines). Between adjacent pairs of the flanges 154 are circumferentially extending recessed surfaces 156, which terminate at chamfered surfaces 158 of the flanges 154.

Figure 5:
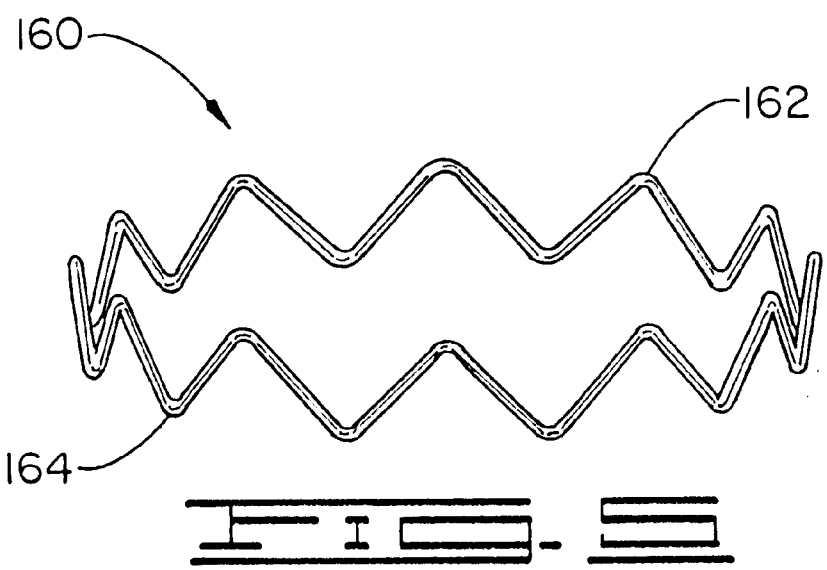
FIG. 5 is a perspective view of a first embodiment of a compression spring member which is a portion of the disc mounting system of the present invention.

FIG. 5 is a perspective view of a compression spring member 160 which can be formed of spring steel having a generally circular cross-section to provide a closed-loop with a characteristic wave shape, including both upper peaks 162 and lower peaks 164. Although the exemplary compression spring member 160 in the figure has twelve upper peaks 162 and a comparable number of lower peaks 164, the scope of the present invention contemplates compression spring members having varying numbers of upper and lower peaks 162, 164, and other wave shapes, as will be discussed in more detail hereinbelow. It is also evident in FIG. 5 that the angular displacement between adjacent upper and lower peaks 162, 164 will be a function of the number of such peaks in the compression spring member 160.

FIG. 5 also shows that the compression spring member 160 is formed in a substantially cylindrical manner. The operative inner diameter of the compression spring member 160 is selected to cooperate with the outer diameter of the hub 150 (see FIG. 4) and the bore of the discs 106 in a manner to be described in detail below.

Figure 6:
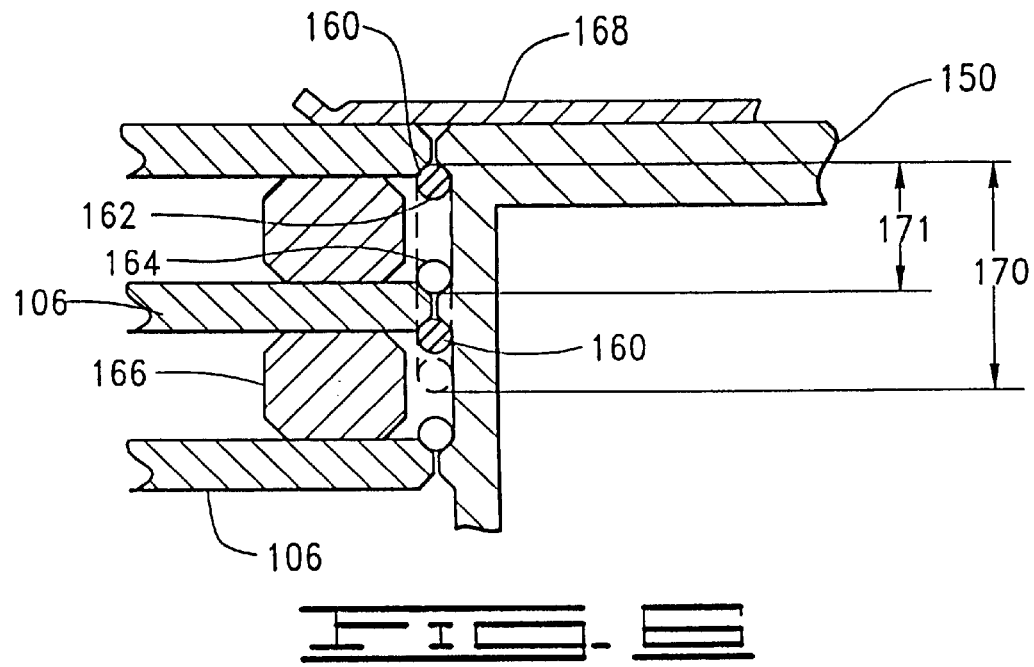
FIG. 6 is a detail sectional elevation view of the disc mounting system of the present invention.

FIG. 6 is a detail sectional elevation view of a portion of a disc stack made in accordance with the present invention. It will be noted the disc stack consists of a spindle motor hub 150, a plurality of discs 106 and a plurality of compression spring members 160. The disc stack also includes a disc spacer 166 located between adjacent pairs of discs 106, and a disc clamp 168, similar to the springtype disc clamp 140 shown in the prior art FIG. 3. As in the previously described prior art, the disc spacers 166 serve to establish the axial spacing between adjacent discs 106 in the disc stack, and the disc clamp 168 applies an axial force to the discs 106 and disc spacers 166 to provide the spaced-apart axial position of the discs 106. In addition to the axial clamping force, by an interaction of the compression spring members 160, the discs 106 and the hub 150 maintain the radial position of the discs 106.

Specifically, FIG. 6 shows that a compression spring member 160 is compressing interposed between adjacent discs 106. The peaks 162, 164 of the compression spring member 160 are engaged against the chamfers at the bore of the discs 106 and against the chamfers 158 of the hub 150. An axially directed force is applied by the compression spring member 160, because the compression spring member 160 is axially compressed from its uncompressed height 170 to a final assembled height 171. The axial force of the compression spring member 160 is transferred into a radial force component by the chamfered edges of the disc 106 and the hub 150.

Figure 7:
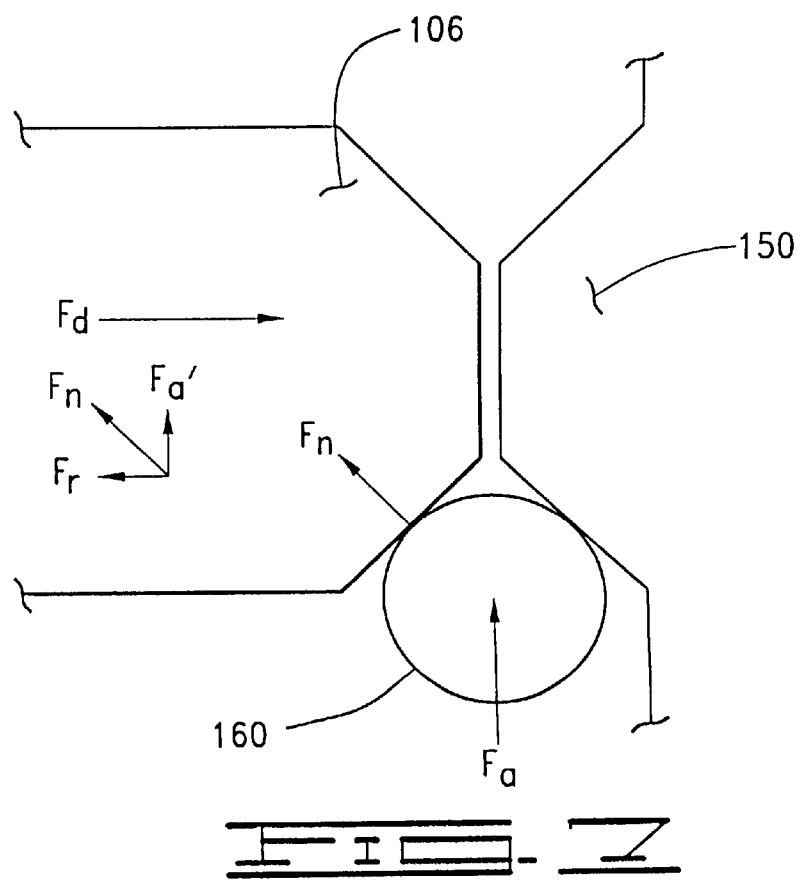
FIG. 7 is a diagrammatical view of a portion of the detail sectional elevation view of FIG. 6, showing the geometric relationship between the elements of a disc stack made in accordance with the present invention.

FIG. 7 is a diagrammatical view of the bore of the disc 106 and the spindle motor hub 150. In the figure, a compression spring member 160 pressingly engages against the chamfers as discussed above to impart an axial force represented by the arrow denoted $F_a$. It should be noted here that the chamfer angle shown in the diagram is illustrative and that discs 106 typically employ chamfers of 30°±1°.

The axial force $F_a$ applied by the compression spring member 160 to the chamfer of the disc 106 imparts a normal force $F_n$ having axial and radial components $F_{a'}$ and $F_r$, as shown by the vector diagram. Although not shown in FIG. 7, a compression spring member 160 above the disc 106 imparts an opposing downward force that will render axial and radial forces. One skilled in the art recognizes how the opposing radial forces serve to clamp the disc 106, and the radial forces urge the disc 106 away from the hub 150. By arranging multiple contact points of the compression spring member 160 against the hub 150 effectively causes the disc 106 to be centered on the spindle motor hub 150 during assembly, thus improving the overall balancing of the disc stack.

With the static forces present in the disc stack understood, it is now possible to analyze the force necessary to displace the disc 106 radially toward the spindle motor hub 150. A displacing force $F_d$ applied laterally to the disc 106 acts against the static forces previously discussed, and, in order to actually displace the disc 106 toward the spindle motor hub 150, has to overcome the frictional engagement between the compression spring member 160 and the spindle motor hub 150. The displacing force $F_d$ can be calculated using the following formula:

$$F_d = F_a(1+2\mu) \tan(\alpha)$$

where:

$F_a$ = axial force applied by the compression spring member, $\mu$ = the coefficient of friction between the disc 106 and compression spring member 160, $\alpha$ = the chamfer angle on the disc 106.

It should be noted that the preceding formula assumes that the displacing force is applied at the location of a point of contact between the disc 106 and the compression spring member 160 (i.e., radially opposite an upper peak 162 or lower peak 164 of the compression spring member 160).

Figure 8:
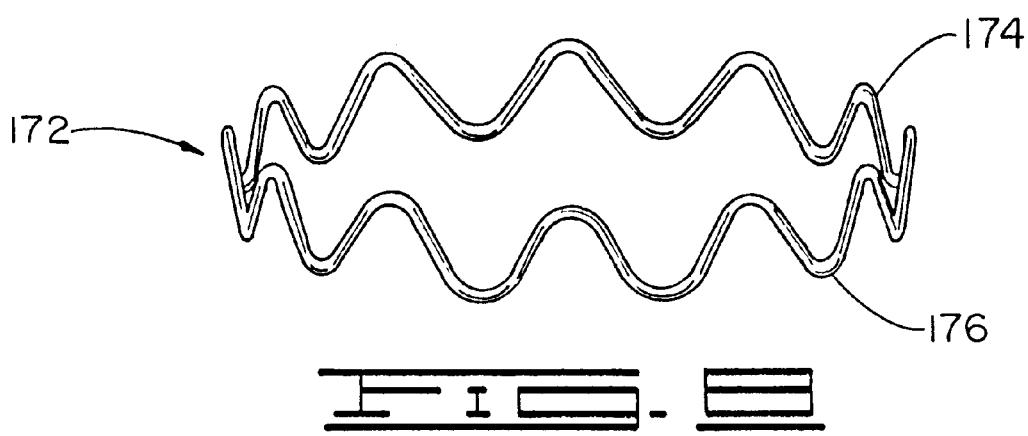
FIGS. 8 through 10 are perspective views of alternative embodiments of compression spring members made in accordance with the present invention.
Figure 9:
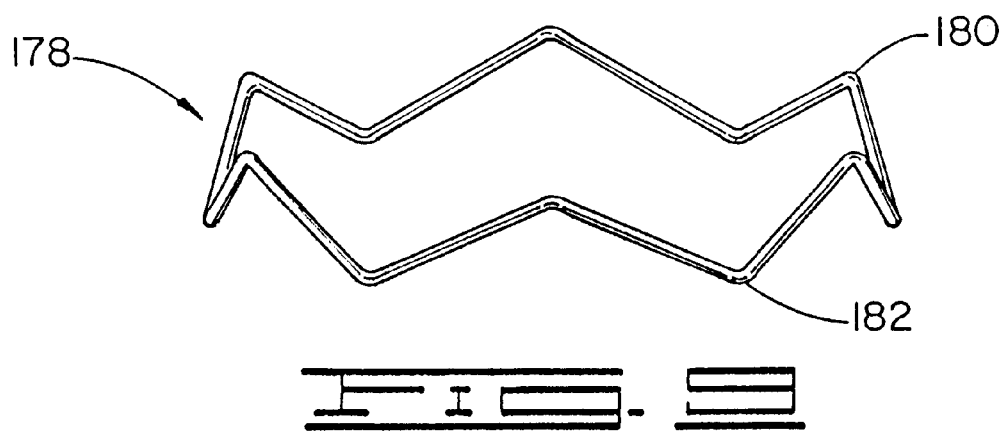
Figure 10:
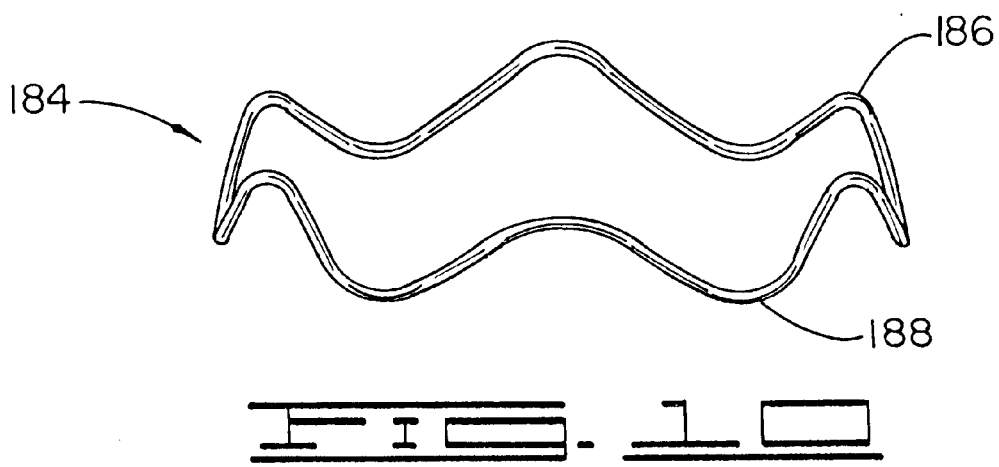

FIGS. 8 through 10 are perspective views of alternative embodiments of compression spring members 160 made in accordance with the present invention. FIG. 8 shows a compression spring member 172, with twelve upper peaks 174 and twelve lower peaks 176, as did the previously discussed compression spring member 160 of FIG. 5. The wave shape of the compression spring member 172, however, is sinusoidal, having a larger radius in transitioning between the axially extended portions. FIG. 9 shows a compression spring member 178 having only six upper peaks 180 and lower peaks 182. Finally, the compression spring member 184 of FIG. 10 includes the sinusoidal wave shape of the compression spring member 172 of FIG. 8 with six upper and lower peaks 186, 188 similar to the compression spring member 178 of FIG. 9.

One of skill in the art will appreciate, after examining FIGS. 5, 8, 9 and 10, that the compression spring member of the present invention can be of various characteristic forms within the intended scope of the present invention, and that, as long as the compression spring member includes at least three upper peaks and three lower peaks, the self-centering aspect of the invention can still be achieved. Furthermore, while the example compression spring members of FIGS. 5, 8, 9 and 10 are shown as continuous rings formed into the compression spring members, the compression spring member can also be formed from wire stock as an interrupted ring.

Figure 11:
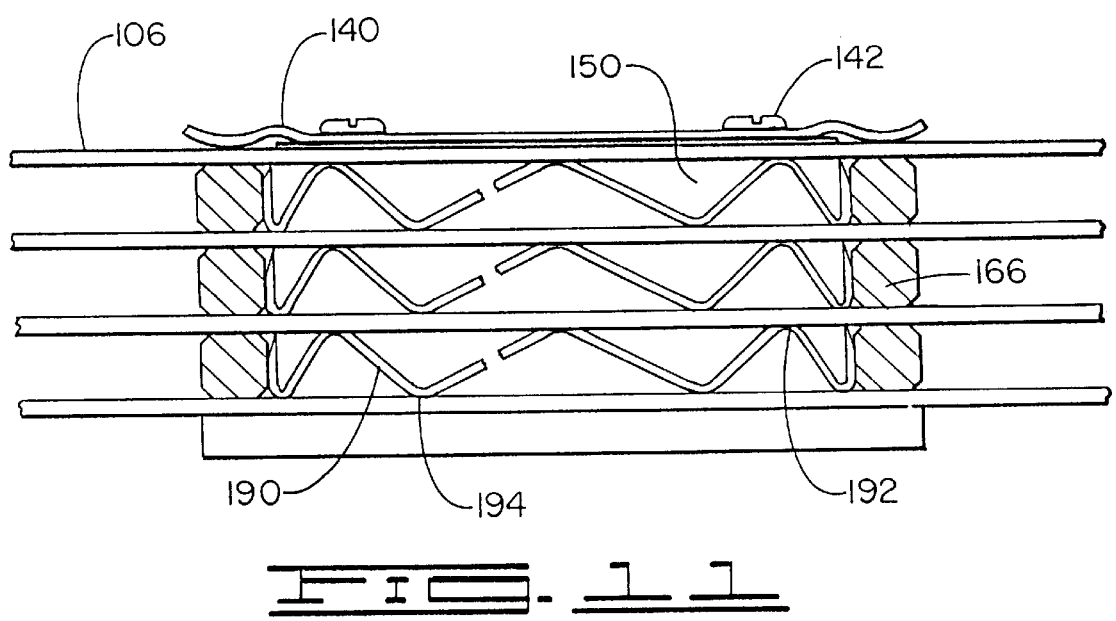
FIG. 11 is a simplified elevation view of a disc stack made in accordance with the present invention.

FIG. 11 is a simplified elevation view of a disc stack made in accordance with the present invention, and shows such an interrupted compression spring member 190. FIG. 11 also serves to illustrate many of the benefits and advantages of the present invention. The figure shows the disc spacers 166 in section at either side of the spindle motor hub 150, and makes apparent that the present invention envisions that the disc spacers 166 be fabricated with an inner diameter intended to closely interface with the outer extreme surface of the compression spring member 190. With this relationship, all axial compression of the compression spring member 190 will result in comparable axially exerted forces within the features of the compression spring members 190, ensuring optimal axial force ($F_a$ in FIG. 7) once the disc stack elements are in the assembled condition shown.

FIG. 11 also shows a disc stack which is clamped to the spindle motor hub 150 using a spring-type disc clamp 140, such as the disc clamp 140 discussed above with regard to the prior art of FIG. 3.

Returning for a moment to FIG. 3, mechanical shocks which are applied to the disc drive 100 in an axis parallel to the spin axis of the spindle motor 108 can potentially overcome the clamping force of the disc clamp 140 if the mechanical shock is of sufficient magnitude. Under such conditions, the prior art disc clamping system of FIG. 3 would lose its resistance to radial shifting of the discs 106 during the shock event, since the only such resistance in the prior art of FIG. 3 is derived from the axially applied clamping force and the resultant frictional force between the discs 106, the disc spacers 134 and the disc mounting flange 132.

Turning back now to FIG. 11, if similar mechanical shocks are applied to the disc stack made in accordance with the present invention, the compression spring members 190 will act to maintain the proper concentric relationship between the discs 106 and the spindle motor hub 150, even in the event of a reduction of clamping force of the disc clamp 140. That is, if the clamping force of the disc clamp 140 is reduced and the discs 106 tend to move axially as a result, the stresses induced in the compression spring member 190 will act to expand the compression spring member 190 axially, keeping the upper and lower peaks 192, 194 of the compression spring member 190 in contact with the chamfers at the bore of each disc 106, thereby urging the discs 106 into the desired concentric relationship relative to the spindle motor hub 150.

Once the shock event terminates, the clamping force of the disc clamp 140 is restored to the disc stack, and the compression spring members 190, discs 106 and disc spacers 166 all return to their original positions, without any radial shifting of the discs 106 due to the shock event.

Thus the present invention provides a disc mounting system which prevents radial displacement of the discs (such as 106) relative to a spindle motor hub (such as 150) due to the application of mechanical shocks. The mounting system includes a wave shaped compression spring member (such as 160) which provides a plurality of upper peaks (such as 162) and lower peaks (such as 164) which bear against chamfers at the bore of the disc. The compression spring members have an uncompressed axial height (such as 170) which is greater than the final compressed, or assembled, height (such as 171), resulting in an axially applied spring force (such as $F_a$) against the chamfers of the discs. The axial force against the chamfers is transferred as axial and radial force components (such as $F_a'$, $F_r$) of force on the discs to maintain the discs in an intended concentric relationship to the spindle motor hub. In another aspect of the invention, the hub of the spindle motor is modified to include annular recesses (such as 156) within which the compression spring members lie in their assembled condition. The annular recesses in the spindle motor hub also include chamfers (such as 158) at their axial extents which are axially aligned with the chamfers on the discs, and which also interact with the upper and lower peaks on the compression spring members to maintain the intended concentric relationship between the discs and the spindle motor hub.

From the foregoing, it is apparent that the present invention is particularly well suited and well adapted to achieve the functionality described hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A disc mounting system for mounting discs on a hub of a spindle motor in a disc stack, the disc mounting system comprising:

a radially extending disc mounting flange at a lower end of the hub supporting a lowermost disc in the disc stack;

a disc spacer interposed between adjacent discs in the disc stack to establish a desired spacing between the adjacent discs;

a disc clamp, bearing against an uppermost disc in the disc stack and exerting an axial clamping force expressed through the discs and disc spacers to the disc mounting flange; and a compression spring member disposed about the hub between adjacent said discs in the disc stack, the compression spring member comprising upper and lower peaks which axially engage chamfers at a bore of each said disc to exert a radially directed force and an axially directed force on each said disc maintaining a fixed concentric relationship of each said disc relative to the hub.

2. A disc mounting system as claimed in claim 1, wherein the compression spring member is wave shaped.

3. A disc mounting system as claimed in claim 2, wherein the wave shape is sinusoidal.

4. A disc mounting system as claimed in claim 1, wherein the upper peaks and lower peaks each number at least three.

5. A disc mounting system as claimed in claim 1, wherein the spindle motor hub further comprises a plurality of circumferentially extending flanges at a first radius and a corresponding plurality of recessed surfaces at a second radius less than the first radius between each adjacent pair of the flanges, wherein each flange is axially aligned with a respective one of the discs, and wherein the compression spring member bears against the respective pair of said discs and flanges to apply the outward radial force and the axially directed force upon said discs.

6. A disc drive including a disc stack comprising alternately stacked discs and spacers mounted to a hub of a spindle motor and a disc mounting system for mounting the discs to the spindle motor hub comprising:

a disc clamp, bearing against an uppermost disc in the disc stack and exerting an axial clamping force through the discs and disc spacers; and at least one compression spring member disposed about the spindle motor hub, each compression spring member interposed between an adjacent pair of the discs and having contact surfaces which pressingly engage portions of the discs and the hub to exert an outward radial force and an axially directed force on the discs to maintain the discs in a concentric relationship about the spindle motor hub, wherein the compression spring member comprises a sinusoidal wave shape.

7. A disc drive as claimed in claim 6, wherein the contact surfaces number at least three.

8. A disc drive as claimed in claim 6, wherein the spindle motor hub comprises a plurality of circumferentially extending flanges at a first radius and a corresponding plurality of recessed surfaces at a second radius less than the first radius between each adjacent pair of the flanges, wherein each flange is axially aligned with a respective one of the discs, and wherein each compression spring member bears against the respective pair of discs and flanges to apply the outward radial force and the axially directed force.

9. A disc drive including a disc stack comprising alternately stacked discs and spacers mounted to a hub of a spindle motor and a disc mounting system for mounting the discs to the spindle motor hub comprising:

a disc clamp, bearing against an uppermost disc in the disc stack and exerting an axial clamping force through the discs and disc spacers; and at least one compression spring member disposed about the spindle motor hub, each compression spring member interposed between an adjacent pair of the discs and having contact surfaces which pressingly engage portions of the discs and the hub to exert an outward radial force and an axially directed force on the discs to maintain the discs in a concentric relationship about the spindle motor hub, wherein the spindle motor hub comprises a plurality of circumferentially extending flanges at a first radius and a corresponding plurality of recessed surfaces at a second radius less than the first radius between each adjacent pair of the flanges, wherein each flange is axially aligned with a respective one of the discs, and wherein each compression spring member bears against the respective pair of discs and flanges to apply the outward radial force and the axially directed force.

10. A disc drive as claimed in claim 9, wherein the compression spring member comprises a wave shape.

11. A disc drive as claimed in claim 10, wherein the wave shape is sinusoidal.

12. A disc drive as claimed in claim 9, wherein the contact surfaces number at least three.

* * * * *